Figure 1:
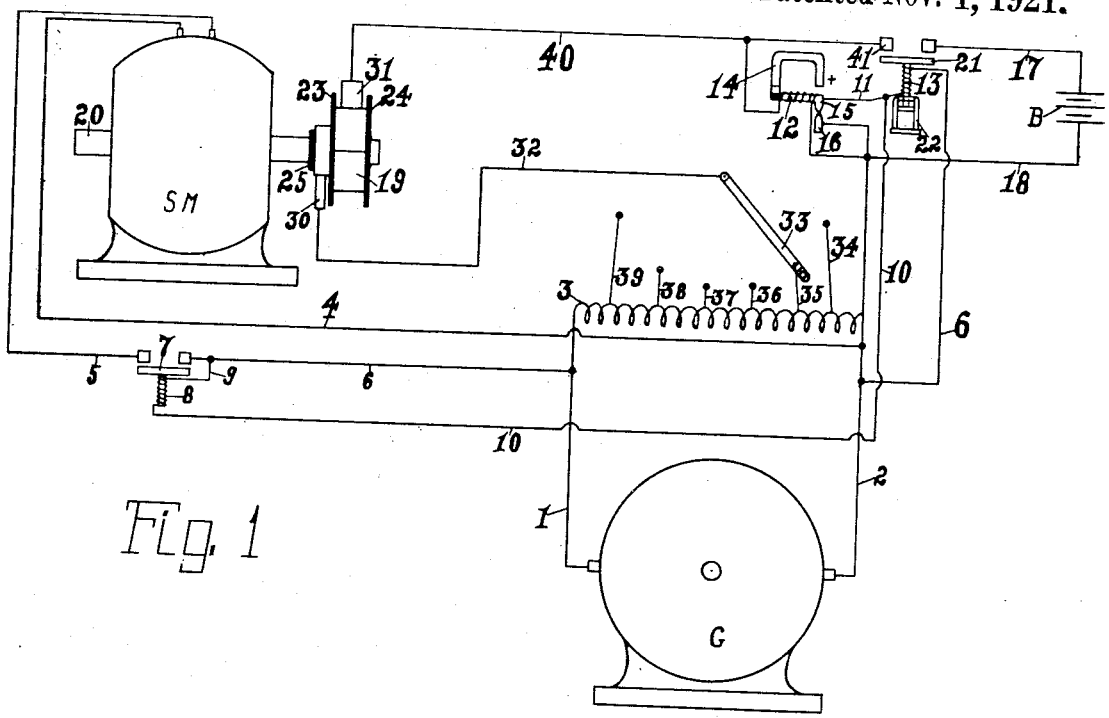

C. J. QUILL.
ALTERNATING CURRENT RECTIFIER.
APPLICATION FILED AUG. 21, 1917. RENEWED AUG. 18, 1921.

1,395,520.

Patented Nov. 1, 1921.

INVENTOR.
C. J. Quill.

BY
Carlos P. Griffin
ATTORNEY.

UNITED STATES PATENT OFFICE.

CHARLES J. QUILL, OF SAN FRANCISCO, CALIFORNIA, ASSIGNOR OF ONE-HALF TO WILLIAM M. FILBEN, OF ST. PAUL, MINNESOTA.

ALTERNATING-CURRENT RECTIFIER.

1,395,520.  Specification of Letters Patent.  Patented Nov. 1, 1921.

Application filed August 21, 1917, Serial No. 187,479. Renewed August 18, 1921. Serial No. 493,461.

*To all whom it may concern:*

Be it known that I, CHARLES J. QUILL, citizen of the United States, residing at San Francisco, in the county of San Francisco, State of California, have invented a new and useful Alternating-Current Rectifier, of which the following is a specification in such full and clear terms as will enable those skilled in the art to construct and use the same.

This invention relates to a mechanical alternating current rectifier of an extremely simple form which will be capable of supplying unidirectional current to any appliance requiring such current.

Another object of the invention is to provide an alternating current rectifier which will give a very high efficiency in return of unindirectional current as compared with current used, in addition to which the apparatus is so constructed that it cannot be short circuited or injured if the supply current is cut off, for it will be understood by those skilled in the art that some apparatus such as storage batteries give off a very destructive current when the supply stops and, unless special apparatus is installed to prevent it, destructive arcing will take place.

Another object of the invention is to produce an extremely simple and safe machine even though it only handles one half the sine wave of current.

The rectifier is operated by means of a synchronous motor capable of making 1800 R. P. M. where 60 cycle alternating current is used.

Other objects of the invention will appear as the description proceeds.

An embodiment of the invention is shown in the drawings in which the same reference numeral is applied to the same portion throughout, but I am aware that there may be modifications thereof.

Figure 2:
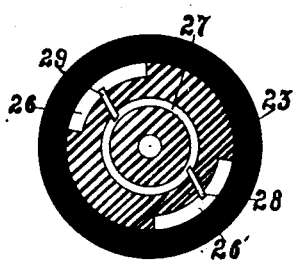
Figure 3:
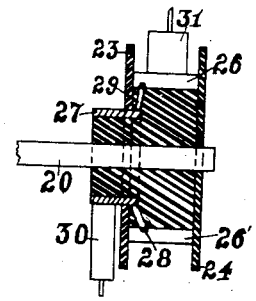

Figure 1 is a diagrammatic view illustrating the arrangement of circuits and the rectifier, Fig. 2 is a transverse sectional view of the rectifier, and Fig. 3 is a section of the rectifier in a plane of its axis.

The rectifier shown and specifically claimed herein is identical with one half of one form of the rectifier shown in my patent application #145,789 on the same invention filed January 31st, 1917.

The numerals 1 and 2 indicate the two parts of a supply circuit extending from the generator G. to a transformer 3. Two wires 4 and 5 extend to a synchronous motor S. M., a wire 6 being connected with 5 by the bar 7 when the magnet 8 is energized. The magnet 8 has a wire 9 connecting with the wire 6 and a wire 10 connected with the wire 11.

The wire 11 connects the two magnets 12 and 13, the former of which is provided with a permanent magnet 14 which maintains the points 15, 16 closed, when the polarity of the current in the wires 17, 18 is correct for the apparatus B to which the unidirectional current is supplied.

The rectifier 19 is mounted on the shaft 20 of the synchronous motor.

The electromagnet has a connecting bar 21 and a dash pot 22 is provided which causes the bar 21 to be moved very slowly to the closed position for a purpose presently to be explained.

The rectifier proper consists of a pair of disks 23, 24, made of a suitable insulating material, a hub 25 of the same material, two segments 26, 26', a collector ring 27 and two connections 28, 29. The ring 27 is mounted on a reduced portion of the hub and the segments 26, 26' are mounted on the larger portion of the hub between the disks 23, 24, and with their peripheries flush with the periphery of the larger portion of the hubs.

A brush 30 bears on the ring 27, while a brush 31 bears on the segments 26, 26' for the delivery of the unidirectional current produced to the apparatus for using it.

A wire 32 extends from the brush 30 to a movable switch bar which may be connected with any of the transformer taps 34 to 39 inclusive. A wire 40 extends from the brush 31 to the contact 41 adjacent the connecting bar 21.

In operation, when current is supplied to the transformer 3 it also energizes the magnets 13 and 8, the latter closing at once, while the former closes very slowly to insure the proper current polarity before current is sent to the battery B.

As soon as the motor picks up the step the continually reversing position of the segments of the rectifier delivers direct current to the magnet 12.

Since the armature of the magnet 12 is non-magnetic, the only magnetism at this point will be that of the coil, and if it is energized by a current of the proper polarity, the points 15, 16 will remain closed. If the motor is out of step, or if the current sent is of the wrong polarity, the points 15, 16 will be separated, since only when the current passes through the coil 12 to make its right hand end positive will the permanent magnet 14 allow it to stay down. When the circuit is broken at 15, 16, the entire system stops, but as soon as it is stopped, the contacts 15, 16 are again made, and the motor is again started. If necessary this action will occur several times until the current comes on in the magnet 12 of the proper polarity. When it does, the connecting bar 21 will have time to close and the load may be continued as long as desired.

The foregoing construction gives a rapidly pulsating unidirectional current, but since the pulsations are so rapid they do not affect the operation of the apparatus using said current.

Having thus described my invention what I claim as new and desire to secure by Letters Patent of the United States is as follows, express reservation being made of permissible modifications.

A current rectifier comprising an alternating current supply circuit, a synchronous motor operated thereby, an alternating current ring, a pair of quarter segments electrically connected with the ring, a brush bearing on the ring, another brush bearing on the segments, a load circuit for direct current, an extension therefrom to the alternating current supply, a polarity indicating circuit closer in the direct circuit, and means to drop the motor out if it is not in step to deliver current of the proper polarity.

In testimony whereof I have hereunto set my hand this 6" day of August A. D. 1917.

CHARLES J. QUILL.